(12) United States Patent
Akselrod et al.

(10) Patent No.: US 10,652,196 B2
(45) Date of Patent: May 12, 2020

(54) RELATIONSHIP CHANGE ALERT

(71) Applicant: International Business Machines Corporation, Armonk, NY (US)

(72) Inventors: Ben Z. Akselrod, Givat Shmuel (IL); Anthony Di Loreto, Markham (CA); Steve McDuff, Markham (CA); Kyle D. Robeson, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 15/147,063

(22) Filed: May 5, 2016

(65) Prior Publication Data

US 2017/0324696 A1    Nov. 9, 2017

(51) Int. Cl.
*H04L 12/58* (2006.01)

(52) U.S. Cl.
CPC ............ *H04L 51/32* (2013.01); *H04L 51/046* (2013.01)

(58) Field of Classification Search
CPC ....... H04L 51/32; H04L 51/046; H04W 68/00
USPC ........................................................ 709/206
See application file for complete search history.

(56) References Cited

U.S. PATENT DOCUMENTS

| 8,473,443 | B2 | 6/2013 | Lewis et al. | |
| 8,954,500 | B2 | 2/2015 | Marlow et al. | |
| 2014/0317184 | A1* | 10/2014 | Weaver | H04L 67/22 709/204 |
| 2014/0379796 | A1* | 12/2014 | Altaf | H04L 63/10 709/204 |
| 2015/0081803 | A1* | 3/2015 | Dick | G06Q 10/107 709/206 |

OTHER PUBLICATIONS

NPL "Context Evaluation of Posts in Social Media", Disclosed anonymously, IP.com No. 000240840.*
Disclosed Anonymously; "Context Evaluation of Posts in Social Media"; IP.com Prior Art Database Technical Disclosure; IP.com No. 000240840; 3 Pages.

* cited by examiner

*Primary Examiner* — James E Springer
*Assistant Examiner* — Patrick F Ngankam
(74) *Attorney, Agent, or Firm* — Alexander G. Jochym

(57) ABSTRACT

A first input is received. The first input is from a first user to one or more second users. The first input includes a text to be sent from the first user to the one or more second users. Whether the text includes a third user is determined. Responsive to determining the text includes the third user, whether a relationship change within a time interval between the one or more second users and the third user is determined. Responsive to determining that there was the relationship change between the one or more second users and the third user, the first user is notified of the relationship change.

11 Claims, 3 Drawing Sheets

RELATIONSHIP CHANGE ALERT

BACKGROUND OF THE INVENTION

The present invention relates generally to the field of social networks, and more particularly to relationship changes in social networks.

A social networking service (also social networking site or SNS) is a platform to build social networks or social relations among people who share similar interests, activities, backgrounds or real-life connections. A social network service consists of a representation of each user (often a profile), his or her social links, and a variety of additional services such as career services. Social network sites are web-based services that allow individuals to create a public profile, create a list of users with whom to share connections, and view and cross the connections within the system. Most social network services are web-based and provide means for users to interact over the Internet, such as e-mail and instant messaging. Social network sites are varied and they incorporate new information and communication tools such as mobile connectivity, photo and/or video sharing, and blogging. Social networking sites allow users to share ideas, pictures, posts, activities, events, and interests with people in their network.

SUMMARY

Embodiments of the present invention include a method, computer program product, and system for notifying a user of a relationship change. In one embodiment, a first input is received. The first input is from a first user to one or more second users. The first input includes a text to be sent from the first user to the one or more second users. Whether the text includes a third user is determined. Responsive to determining the text includes the third user, whether a relationship change within a time interval between the one or more second users and the third user is determined. Responsive to determining that there was the relationship change between the one or more second users and the third user, the first user is notified of the relationship change.

DETAILED DESCRIPTION

Embodiments of the present invention recognize that when posting comments to a specific individual (receiver), a user (poster) may make reference to another person (third-party) in a post, where the third-party has a relationship with the receiver. Sometimes, a poster may be unaware of a relationship change between a receiver and a third-party. If the status of the relationship between the receiver and the third-party has otherwise changed, the comment may offend or otherwise create an awkward/embarrassing situation for the poster and/or receiver. Advantages of some embodiments of the invention include: (i) detection of a relationship change when a third party is mentioned and (ii) an alert to notify a user that may be unaware of a relationship change between two other parties.

The present invention will now be described in detail with reference to the Figures.

Figure 1:
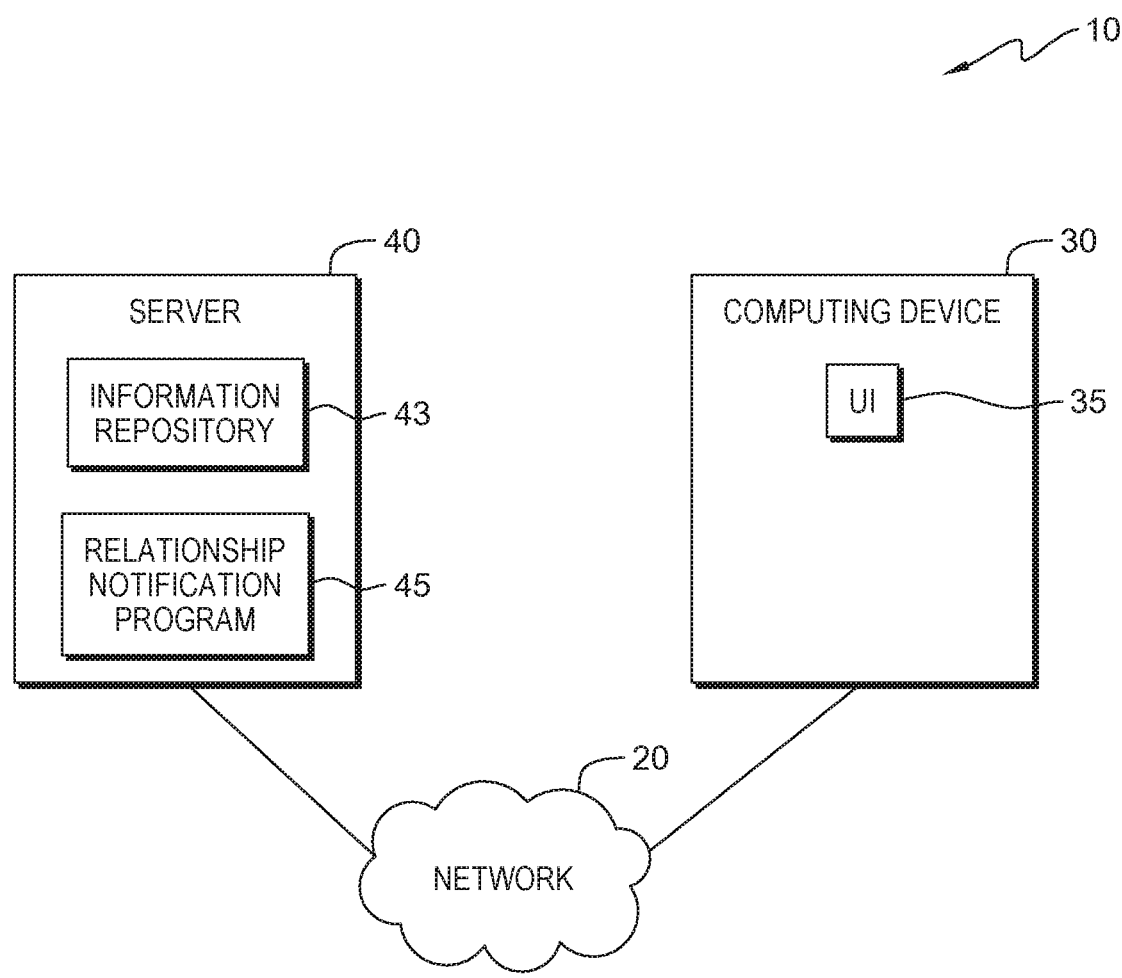
FIG. 1 is a functional block diagram illustrating a computing environment, in accordance with an embodiment of the present invention.

FIG. 1 depicts a diagram of computing environment 10 in accordance with one embodiment of the present invention. FIG. 1 provides an illustration of one embodiment and does not imply any limitations with regard to the environments in which different embodiments may be implemented.

In the depicted embodiment, computing environment 10 includes computing device 30 and server 40 interconnected over network 20. Network 20 may be a local area network (LAN), a wide area network (WAN) such as the Internet, any combination thereof, or any combination of connections and protocols that will support communications between computing device 30 and server 40 in accordance with embodiments of the present invention. Network 20 may include wired, wireless, or fiber optic connections. Computing environment 10 may include additional computing devices, servers, or other devices not shown.

Computing device 30 may be a desktop computer, laptop computer, tablet computer, personal digital assistant (PDA), or smart phone. In general, computing device 30 may be any electronic device or computing system capable of executing computer readable program instructions, and communicating with server 40 over network 20. In an embodiment, computing device 30 contains user interface (UI) 35. Computing device 30 may include components as depicted and described in further detail with respect to FIG. 3.

UI 35 operates on computing device 30 to visualize content, such as menus and icons, and to allow a user to interact with an application accessible to computing device 30. In an embodiment, UI 35 includes an interface for relationship notification program 45. In an embodiment, UI 35 provides an interface to interact with relationship notification program 45 and any social network. In an embodiment, relationship notification program 45 is an add-on to another program (e.g., a social media application). UI 35 may display data received from relationship notification program 45 and send input received from a user of computing device 30 to relationship notification program 45. In other embodiments, UI 35 may comprise one or more interfaces such as, an operating system interface and/or application interfaces. In example embodiments, a user of computing device 30 communicates with relationship notification program 45 via UI 35.

A user interface, as shown by UI 35, is a program that provides an interface between a user and an application. A user interface refers to the information (such as graphics, text, sound, and haptic feedback) a program presents to a user and the control sequences the user employs to control the program. There are many types of user interfaces. In an embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. The actions in GUIs are often performed through direct manipulation of the graphics elements.

Server 40 may be a management server, a web server, or any other electronic device or computing environment capable of processing computer readable program instructions, and receiving and sending data. In other embodiments, server 40 may be a laptop computer, tablet computer, personal computer (PC), a desktop computer, or any programmable electronic device capable of communicating with computing device 30 via network 20. In other embodiments, server 40 may represent a server computing environment utilizing multiple computers as a server system, such as in a cloud computing environment. In another embodiment, server 40 represents a computing environment utilizing clustered computers and components to act as a single pool of seamless resources. In an embodiment, server 40 includes information repository 43 and relationship notification program 45. Server 40 may include components as depicted and described in further detail with respect to FIG. 3.

In an embodiment, information repository 43 is a repository that may be written to and/or read by relationship notification program 45. In an embodiment, information repository 43 stores data such as, but not limited to, social graphs, relationship history (including the date of the relationship change and the person(s) involved), and a dictionary of terms that represent relationship types (used to identify relationships mentioned in posts). Relationship types include, but is not limited to, social relationships, romantic relationships, familial relationships, marital relationships, professional relationships, etc. In an embodiment, an algorithm may use data stored to information repository 43 to determine changes in relationships, to identify a user, and to generate a list of network contacts. In some embodiments, information repository 43 resides on server 40. In other embodiments, information repository 43 may reside on another server, or another computing device, provided that information repository 43 is accessible to relationship notification program 45.

Information repository 43 may be implemented using any volatile or non-volatile storage media for storing information, as known in the art. For example, information repository 43 may be implemented with a tape library, optical library, one or more independent hard disk drives, or multiple hard disk drives in a redundant array of independent disks (RAID). Similarly, information repository 43 may be implemented with any suitable storage architecture known in the art, such as a relational database, an object-oriented database, or one or more tables.

In an embodiment, relationship notification program 45 operates to detect if a relationship change has occurred between an intended receiver of a comment and a third-party when a poster mentions (i.e., types) the name of the third-party into a text field. A text field includes a comment or a message or any other field that a user can type text into. In an embodiment, the intended receiver of the inputted text is an individual. In another embodiment, the intended receiver of the inputted text is a group or an entity. In an embodiment, the third-party refers to an individual. In another embodiment, the third-party is a group or an entity. The text field may be a comment or a message from a first user (i.e., the poster of the inputted text) to a second user or a group of users (i.e., the intended receiver(s) of the inputted text). In an embodiment, relationship notification program 45 uses data from an algorithm to determine the identity of the third-party that is mentioned in the text field by the first user to the second user of the same social network site. For example, Eric inputs text into a text field on a photo posted by Lisa. While typing in the text field, Eric types, "Bob." Using data gathered by the algorithm, relationship notification program 45 determines that Eric is referring to "Bob Smith." In an embodiment, relationship notification program 45 uses natural language processing (NLP) to determine the identity of the third-party and/or to determine a relationship (between the receiver of the inputted text and the third-party). For example, relationship notification program 45 uses NLP to search for names in the inputted text, to detect names in the inputted text, to detect terms that refer to a relationship in the inputted text, and/or to determine a relationship between users. In an embodiment, relationship notification program 45 receives the determined identity of the mentioned third-party name from another program. For example, Eric types "Bob" into the text field of a photo posted by Lisa on Social Network A. An NLP program on Social Network A determines that the identity of the "Bob" that Eric typed into the text field is "Bob Smith." Relationship notification program 45 receives the name "Bob Smith" and determines the relationship between Lisa and Bob Smith. In another embodiment, relationship notification program 45 receives the name and identity of the third-party from a program not shown.

In an embodiment, relationship notification program 45 may determine a relationship using statistical analysis and thresholds. In some scenarios and embodiments, relationship notification program 45 can identify a pattern of communication based on, but is not limited to, one or more of a frequency of communication between users, timing of such communications, and the response time of one user to another. For example, frequent communications between users may be one factor that indicates a strong relationship between those users. Also, a short response time to one another may indicate a perceived importance of one user to another. In some embodiments and scenarios, relationship notification program 45 may determine a score or value for an event that has occurred or may occur. In some embodiments, patterns in communications are leveraged when identifying a relationship. For example, relationship notification program 45 identifies a series of emails between user A and user B. The emails are only being sent on weekdays during business hours. Further, relationship notification program 45 has access to the schedules of both user A and user B. Based on the timestamps of the emails and their work schedules, relationship notification program 45 determines that the relationship between user A and user B is most likely a professional type of relationship. In some embodiments, relationship notification program 45 analyses the contents of the emails to further modify to a confidence score that the relationship between user A and user B meets the criteria of a given type of relationship. In other words, relationship notification program 45 can take into account factors such as, but are not limited to: the timestamp of communications, the frequency of communications, response times to communications, and the content of those communications when determining a type of relationship.

In some embodiments, relationship notification program 45 identifies one or more of certain words or phrases, and media content that are included in communications between users and leverages that knowledge when determining a type of relationship between users. For example, the inclusion of personal pictures, i.e., not work related, can indicate a personal relationship exists between certain users. In one embodiment, a type of event has a predetermined score. As such, if that event occurs then relationship notification program 45 leverages that score when determining relationships. For example, an email between Bob and Lisa discussing their upcoming wedding may provide a score of 8. Continuing the example, an email between Bob and Lisa discussing plans for the weekend may provide a score of 3. Relationship notification program 45 determines whether the aggregate score of the events to be 11. Relationship notification program 45 determines whether the aggregate score is greater or less than a threshold (i.e., a threshold of 10 is whether two parties are in a relationship). In this example, relationship notification program 45 determines Bob and Lisa are in a relationship because the aggregate score of 11 is greater than the threshold of 10.

In another embodiment, relationship notification program 45 may determine a relationship change using statistical analysis and thresholds. In one such embodiment, relationship notification program 45 leverages a knowledge of key words and/or phrases that are known to be associated with and can be used to identify a particular type of relationship. For example, relationship notification program 45 leverages a knowledge of terms of endearment and the use of formal titles in communications between users to identify that certain types of relationships exist between those users.

Further, relationship notification program 45 may determine a change in relationship based on a change in a score or value of an event happening. Continuing the previous example including Bob and Lisa, relationship notification program 45 has determined that Bob and Lisa are in a type of relationship (denoted "A" for simplicity). At a later date, relationship notification program 45 determines that an email between Bob and Lisa includes a discussion of an upcoming event they both may attend and that Bob and Lisa are both asking each other if they are going to attend that event. Also, the email includes a number of questions and subsequent answers between Bob and Lisa that inquire about personal details. In this example they both ask how the other is doing and Lisa asks Bon if he likes his new job. Based on the language of the emails, relationship notification program 45 determines a score of 3 for the relationship. In this example, relationship notification program 45 determines that the words/language of the email indicate they are no longer in an A type of relationship, instead their relationship now meets the criteria of a type of relationship denoted "B". In this example, relationship notification program 45 determines that the difference between the relationship score determine previously (i.e., 11) and the newly determined relationship score (i.e. 3) is 8. The determined difference of 8 is greater than a threshold and therefore relationship notification program 45 determines there was a relationship change between Bob and Lisa.

In an embodiment, relationship notification program 45 detects if a relationship change has occurred between the intended receiver of the inputted text and the third-party mentioned in the inputted text. For example, relationship notification program 45 determines that the intended receiver of the inputted text and the third-party mentioned in the inputted text are co-workers. In an embodiment, relationship notification program 45 alerts the user inputting the text, if the user inputting the text mentions the third-party and there was a relationship change between the third-party and the intended receiver of the inputted text. In an embodiment, relationship notification program 45 alerts the poster if relationship notification program 45 determines that the poster may not be aware of the relationship change. In an embodiment, relationship notification program 45 determines a poster may not be aware of a relationship change if the poster mentions a third-party to the receiver for the first time since the relationship change occurred. In an embodiment, relationship notification program 45 determines if the poster is aware of a relationship change between the receiver of the inputted text and the third-party mentioned in the inputted text by determining if the poster mentioned the third-party in another text field (e.g., comment or post) within a certain period of time since the relationship change. For example, relationship notification program 45 determines if there was a relationship change between Lisa (the intended receiver of the inputted text) and Bob (the third-party mentioned in the inputted text) within the past six months. In an embodiment, relationship notification program 45 may determine that the poster is unaware of a relationship change if the relationship change has been mentioned on a page or comment that the poster has not yet viewed. In an embodiment, relationship notification program 45 determines to alert the poster based on the context of the comment of the poster. For example, Lisa recently left Company A for Company B. Relationship notification program 45 receives an indication that Eric inputted, "I look forward to seeing you at the annual meeting for Company A," into the text field a post by Lisa. Before the inputted text is transmitted and made visible to Lisa, relationship notification program 45 determines to alert Eric that Lisa recently left Company A for Company B. The alert gives Eric the opportunity to either change the inputted text, send the inputted text as-is (i.e., choosing to send the text as-is after being notified of the relationship change), or to decide to not send any text at all.

Figure 2:
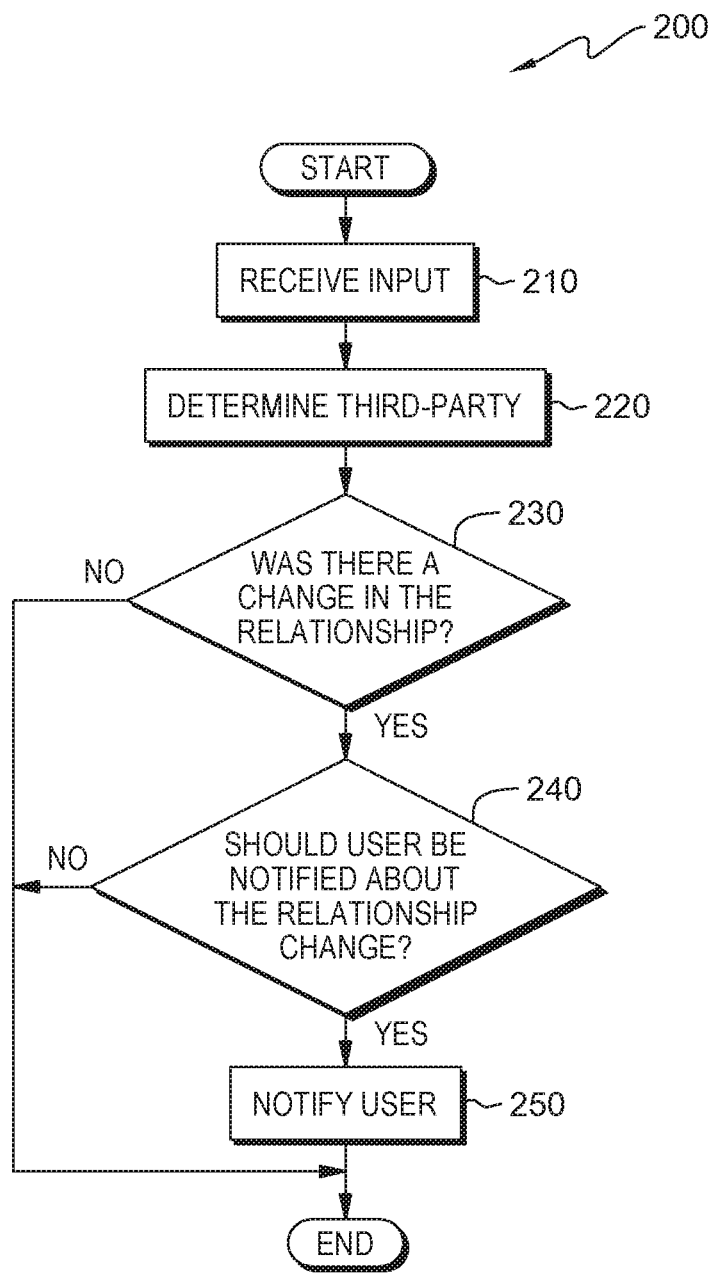
FIG. 2 is a flowchart of operational steps of a relationship notification program notifying a user of a relationship change between two parties.

FIG. 2 depicts a flowchart of operational steps 200 of relationship notification program 45 executing within the computing environment of FIG. 1, in accordance with an embodiment of the present invention. Relationship notification program 45 operates to notify a user of a relationship change between two parties. In an embodiment, the steps of the workflow are performed by relationship notification program 45. Alternatively, steps of the workflow can be performed by any other program while working with relationship notification program 45. A user can invoke operational steps 200 by inputting text into a field, within a social network, that includes the name of a third-party.

In an embodiment, relationship notification program 45 receives an indication that a user of computing device 30 is inputting text into a field for a receiver to view. The user of computing device 30 inputs the name of a third-party, triggering a response from relationship notification program 45 to identify the third-party and to determine if there was a relationship change between the third-party and the receiver of the inputted text, if relationship notification program 45 identifies the third-party. In an embodiment, relationship notification program 45 identifies the third-party, determines if a relationship change occurred between the receiver and the third party, and notifies the user, if applicable, of the relationship change prior to the posting of the inputted text (i.e., visible to users who have access to the post), which allows the user of computing device 30 to be notified of a relationship change prior to the text being visible to other users in network 20. In an embodiment, the user of computing device 30 is also referred to as a "poster." A poster is a user who posts text to a field within the social network. In an embodiment, the user of computing device 30 is a user of a social network that is posting text to a field within the social network. In an embodiment, a "receiver" is a user of a social network that the user of computing device 30 directs the text to. In an embodiment, a "third-party" is any person or entity that is not the "poster" or the "receiver" of the inputted text.

In step 210, relationship notification program 45 receives input from the user of computing device 30. In an embodiment, the received input is text that is typed into a field within the social network by the user of computing device 30. For example, the user of computing device 30 types text into a text field (e.g., comment box) on a social media site. In an embodiment, the received input could be any text typed into a field within the social network (e.g., the name of a third-party).

In step 220, relationship notification program 45 determines the third-party. In an embodiment, relationship notification program 45 receives input from the user of computing device 30. The received input includes the name of a third-party. For example, relationship notification program 45 receives input with text that includes the name "Bob." In an embodiment, relationship notification program 45 uses an algorithm to determine the identity of the third-party name that the user of computing device 30 included within the inputted text. In an embodiment, relationship notification program 45 determines the identity of the third-party by the context of the inputted text. For example, relationship notification program 45 receives input from the user of computing device 30 that includes the name "Bob." There are multiple Bobs in the social network that the user of computing device 30 could be referring to. Relationship notification program 45 receives "Bob and I will be performing a piano duet at Generic Concert Hall next week. I hope that you will be able to make it." Based on the context (i.e., a piano duet), relationship notification program 45 determines the user of computing device 30 is referring to Bob Smith, a professional pianist, since there is no known information that links the other Bobs to the piano. In another example, relationship notification program 45 receives "I saw your mom at the store yesterday evening." Based on the context of the comment (usage of the pronoun "mom"), relationship notification program 45 determines the identity of the third-party the user of computing device 30 inputted into a field on a social media site.

In an embodiment, relationship notification program 45 determines the identity of a third-party by prompting the user of computing device 30 to specify the identity of the third-party. For example, relationship notification program 45 receives input with the name "Bob." Relationship notification program 45 determines that there are five possible Bobs to which the user of computing device 30 may be referring to. Relationship notification program 45 prompts the user of computing device 30 to select which Bob of the five potential Bobs to which the user of computing device 30 is referring to. Relationship notification program 45 prompts the user of computing device 30 by using a pop-up requesting the user of computing device 30 to select the Bob to which the user of computing device 30 is referring to.

In an embodiment, when relationship notification program 45 receives input from the user of computing device 30 that includes the name of a third-party, relationship notification program 45 uses an algorithm to gather a list of names from the network of the user of computing device 30 and/or the network of the receiver of the comment inputted by the user of computing device 30. For example, relationship notification program 45 receives input from the user of computing device 30 that includes the name "Bob." Relationship notification program 45 uses an algorithm to identify users with the name Bob that are in the social network of the user of computing device 30 and the social network of the receiver of the comment inputted by the user of computing device 30. Relationship notification program 45 generates a list of five users with the name Bob that are in the social network of the user of computing device 30 and/or the social network of the receiver of the comment inputted by the user of computing device 30.

In an embodiment, relationship notification program 45 uses natural language processing to determine the identity of the third-party name that was inputted by the user of computing device 30. For example, relationship notification program 45 uses natural language processing to determine the context of the inputted text to identify the third-party. In an embodiment, if relationship notification program 45 receives input from the user of computing device 30 that includes the names of two or more third-party users, relationship notification program 45 determines the identity of each name inputted by the user of computing device 30. In another embodiment, if relationship notification program 45 receives input from the user of computing device 30 that includes the names of two or more third-party users, relationship notification program 45 determines the identity of one or more of the third-party user names inputted by the user of computing device 30. In an embodiment, relationship notification program 45 uses an algorithm to determine which third-party user(s) relationship notification program 45 should determine the identification for.

In an embodiment, relationship notification program 45 determines the identity of the third-party by analyzing data (e.g., users) in the social network that the name was inputted into. In another embodiment, relationship notification program 45 determines the identity of the inputted third-party by analyzing data found in another social network, if the social network is linked to the original social network that received the input. For example, the user of computing device 30 is a user of Social Network A and a user of Social Network B. The user of computing device 30 configured the settings of Social Network A and the settings of Social Network B so that the Social Network A account of the user of computing device 30 is linked to the Social Network B account of the user of computing device 30. In another embodiment, relationship notification program 45 searches the data of another social network. For example, relationship notification program 45 received permission from the user of computing device 30 to search data anywhere on the internet or another social network that might have information on another user.

In decision block 230, relationship notification program 45 determines if there was a relationship change. In an embodiment, relationship notification program 45 determines if there was a relationship change between the receiver of the inputted text and the third-party mentioned in the inputted text. In an embodiment, relationship notification program 45 uses an algorithm to detect a relationship change between two users. Examples of a relationship change include, but are not limited to, marriage, divorce, change of employer, death, termination of a friendship, general change of life events, change of professional relationship, and any other relational change that may occur between people and/or entities. In an embodiment, relationship notification program 45 determines if a relationship change occurred based on metadata associated with users on the social network. In an embodiment, relationship notification program 45 determines a change in relationship based on changes to a social network account. For example, direct changes on a social network may include, but is not limited to, users like no longer being "friends", "connected", or "following," a user changing his or her relationship status from "in a relationship" with the third-party to "single," or a user changing his or her account from indicating he or she is still in school to indicating that he or she graduated. In another embodiment, relationship notification program 45 determines if a relationship change occurred by indirect activity. Indirect activity may include, but is not limited to, a user posting a comment on a post or a photo indicating the relationship change.

For example, relationship notification program 45 receives input that the user of computing device 30 typed text into a comment field on a post of Receiver B. The inputted text includes the name of Third-Party C. Relationship notification program 45 determines that a relationship change occurred between Receiver B and Third-Party C based on a comment Receiver B wrote on a different post posted by User B that made mention of the relationship change. In an embodiment, relationship notification program 45 may receive input from a user, via network settings, sources of information the user wants or does not want relationship notification program 45 to use to make a determination. For example, relationship notification program 45 receives input that User A does not want relationship notification program 45 to analyze comments made by User A on public forums to notify other users of a relationship change User A had with another person or entity.

In an embodiment, relationship notification program 45 determines there is a relationship change if there was a relationship change between at least one individual of an intended group of receivers and a third-party. Conversely, relationship notification program 45 determines there was a relationship change if there was a relationship change between at least one individual in a third-party group and the intended receiver of the inputted text. For example, relationship notification program 45 receives an indication that Eric intends to post, "All of you are invited to the party that Lisa and I are hosting this weekend," to a fishing group on Social Network A. Relationship notification program 45 determines that Sarah, a member of the fishing group, and Lisa are no longer friends. Relationship notification program 45 determines to alert Eric that Sarah and Lisa are no longer friends.

If relationship notification program 45 determines that a relationship change did not occur between the receiver of the inputted text and the third-party mentioned in the inputted text (decision block 230, no branch), processing ends. Thus, relationship notification program 45 enables input from the sender to be sent to the receiver without any interruption or warnings from relationship notification program 45.

If relationship notification program 45 determines that a relationship change did occur between the receiver of the inputted text and the third-party mentioned in the inputted text (decision block 230, yes branch), relationship notification program 45 determines if the user of computing device 30 should be notified of the relationship change between the receiver of the inputted text and the third-party mentioned in the inputted text. In an embodiment, relationship notification program 45 determines if the user of computing device 30 should be notified based on whether the user of computing device 30 may be aware of the change in relationship. Thus, relationship notification program 45 checks whether the sender is aware of the relationship change between the receiver and the third-party. If relationship notification program 45 determines the user of computing device 30 is aware of the relationship change, relationship notification program 45 determines that the user of computing device 30 does not need to be notified about the relationship change. In an embodiment, relationship notification program 45 determines if the user of computing device 30 may be aware of the relationship change if the user of computing device 30 acknowledges the relationship change, directly or indirectly. For example, relationship notification program 45 determines that the user of computing device 30 is aware of the relationship change if the user of computing device 30 mentions the relationship change in a private message, if the user of computing device 30 posts something about the relationship change, or if the user of computing device 30 "likes" or comments on a post that mentions the relationship change.

In an embodiment, relationship notification program 45 uses an algorithm to analyze the communication history (e.g., previous conversations or posts) of computing device 30 to determine if the user of computing device 30 may be aware of the relationship change. In an embodiment, relationship notification program 45 analyzes any form of electronic communication via the social network for any form of acknowledgement by the user of computing device 30 of the relationship change. In an embodiment, relationship notification program 45 takes the context of the inputted text into account when determining whether to notify the user of computing device 30 of the relationship change. In another embodiment, relationship notification program 45 determines to notify the user of computing device 30 without taking the context of the text into consideration. In an embodiment, the receiver of the inputted can set network settings indicating to relationship notification program 45 a relationship change that occurred. For example, relationship notification program 45 receives input that the receiver of inputted text wants relationship notification program 45 to notify other users about a relationship change with Third-Party B when users mention Third-Party in text that will be received by the receiver of the inputted text.

In an embodiment, relationship notification program 45 determines the user of computing device 30 should be notified of the relationship change if the relationship change occurred within a certain period of time from the time of the inputted text. For example, relationship notification program 45 determines to notify Eric of relationship changes within a year of the intended post. On Jan. 1, 2016, relationship notification program 45 receives an indication that Eric mentioned Company A in a comment intended for Lisa. Relationship notification program 45 determines there was a relationship change between Lisa and Company A between Jan. 1, 2015 and Jan. 1, 2016. Relationship notification program 45 notifies Eric of the relationship change between Lisa and Company A.

If relationship notification program 45 determines that the user of computing device 30 should be notified of the relationship change (decision block 240, yes branch), relationship notification program 45 notifies the user of computing device 30 (step 250). In an embodiment, relationship notification program 45 notifies the user of computing device 30 of the relationship change between the receiver of the inputted text and the third-party mentioned in the inputted text. In an embodiment, relationship notification program 45 notifies the user of computing device 30 in real-time. For example, the user of computing device 30 is typing into a comment into a text field on a picture posted by Receiver B. The user of computing device 30 types "Bob" into the text field. Relationship notification program 45 identifies the identity of "Bob." Relationship notification program 45 determines to notify the user of computing device 30 of a relationship change that occurred between Receiver B and "Bob." While the user of computing device 30 is still typing text into the comment field, relationship notification program 45 notifies the user of computing device 30 of the relationship change between Receiver B and "Bob." In another embodiment, relationship notification program 45 notifies the user of computing device 30 of a relationship change between the receiver of the text and a third-party when the user of computing device 30 tries to submit the text (i.e., make the text visible to other user(s) in network 20). For example, the user of computing device 30 types text in a comment field on a post posted by Receiver B that includes the name "Bob." When the user of computing device 30 clicks "submit", relationship notification program 45 notifies the user of computing device 30 of the relationship change between Receiver B and "Bob" to allow the user of computing device 30 to edit the post, if the user of computing device 30 thinks the text is inappropriate in light of the new information. In an embodiment, relationship notification program 45 notifies the user of computing device 30 of various relationship changes or life events (e.g., divorce, engagement, marriage, pregnancy, new job, graduation, death, the start or end of a business partnership, etc.). Processing ends when the user of computing device 30 is notified.

In an example embodiment, relationship notification program 45 receives input from Poster A that Poster A wants to post a comment to a photo of Receiver B. Poster A mentions Third-Party C in the comment that Poster A wants to post to the photo of Receiver B. Relationship notification program 45 uses an algorithm to determine the identity of Third-Party C. relationship notification program 45 determines if Receiver B and Third-Party C had or has a relationship. If Receiver B and Third-Party C have a relationship, relationship notification program 45 determines if there was a change in the relationship of Receiver B and Third-Party C. If there was a change in the relationship between Receiver B and Third-Party C, relationship notification program 45 determines whether to notify Poster A of the relationship change. Relationship notification program 45 determines to notify Poster A of the relationship change between Receiver B and Third-Party C by analyzing prior correspondences between Poster A and Receiver B. If Poster A has not mentioned Third-Party C to Receiver B since the relationship changed, relationship notification program 45 determines to alert Poster A in the event that Poster A is unaware of the relationship change between Receiver B and Third-Party C. Relationship notification program 45 alerts Poster A with a pop-up message stating that there has been a relationship change between Receiver B and Third-Party C. Relationship notification program 45 asks Poster A if Poster A would like to proceed with the post. Poster A declines.

In another example, relationship notification program 45 receives input from Poster A that Poster A wants to write a comment mentioning Third-Party C on a post of Receiver B. relationship notification program 45 determines the identity of Third-Party C. Relationship notification program 45 uses heuristics to determine if the poster is mentioning Third-Party C in a way that implies the former relationship by identifying nouns and verbs that infer a relationship. Relationship notification program 45 uses the dictionary of terms stored in information repository 43. Relationship notification program 45 maps terms stored in information repository 43 words to various types of relationships. Relationship notification program 45 determines Poster A was not implying the former relationship. Relationship notification program 45 determines not to alert Poster A based on the context of the comment.

Figure 3:
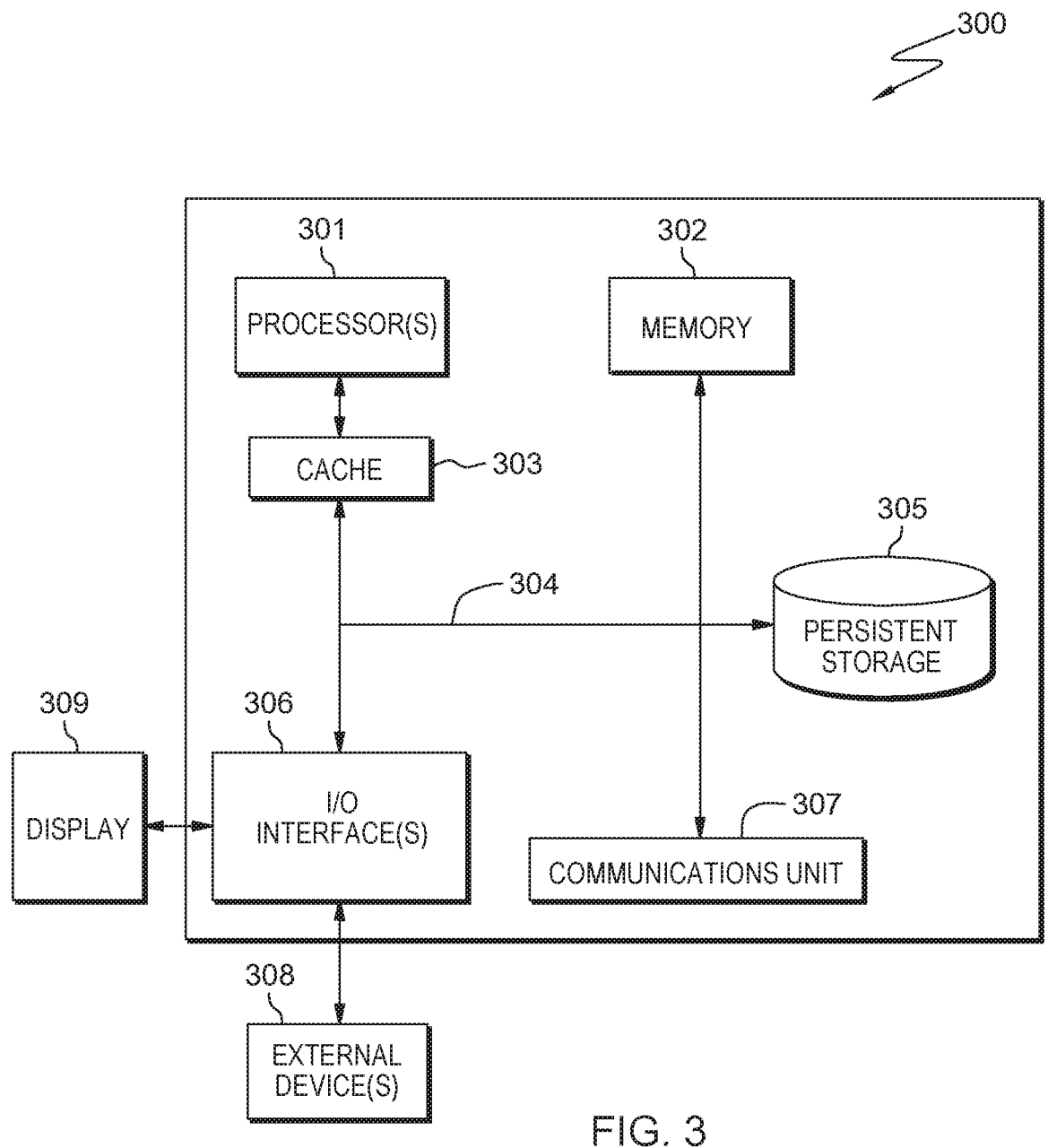
FIG. 3 depicts a block diagram of components of the computing device of FIG. 1, in accordance with an embodiment of the present invention.

FIG. 3 depicts computer system 300, which is an example of a system that includes relationship notification program 45. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for notifying a user of a relationship change, the method comprising:
   receiving, by one or more computer processors, a first input, wherein the first input is from a first user to one or more second users, and wherein the first input includes a text to be sent from the first user to the one or more second users;
   determining, by one or more computer processors, whether the text includes a third user, wherein the text is a comment, and wherein the third user is not one of the one or more second users;
   responsive to determining the text includes the third user, determining, by one or more computer processors, whether there was a relationship change between the one or more second users and the third user;
   responsive to determining there was a relationship change between the one or more second users and the third user, determining, by one or more computer processors, whether the first user is aware of the relationship change between the one or more second users and the third users, wherein the determination is made by whether the first user viewed a page or a comment that mentioned the relationship change;
   responsive to determining that the first user is not aware of the relationship change between the one or more second users and the third user, notifying, by one or more computer processors, the first user of the relationship change;
   responsive to notifying the first user of the relationship change, receiving, by one or more computer processors, a second input, wherein the second input is from the first user to the at least one second user, and wherein the second input includes modifying the text to be sent from the first user to the at least one second user; and
   responsive to receiving the second input, discarding, by one or more computer processors, the first input and transmitting the second input from the first user to the at least one second user.

2. The method of claim 1, further comprising:
   responsive to notifying the first user of the relationship change, receiving, by one or more computer processors, an indication from the first user, wherein the indication is to transmit the text from the first user to the at least one second user.

3. The method of claim 1, wherein the step of determining, by one or more computer processors, whether there was a relationship change between the one or more second users and the third user uses natural language processing to detect and identify words that infer a change in relationship.

4. The method of claim 1, wherein the relationship change is one or more of the following: a change to a relationship between the one or more second users and the third user, a change in status of a relationship between the one or more second users and the third user, an interaction change of a relationship between the one or more second users and the third user, an end of a relationship between the one or more second users and the third user, or a formation of a relationship between the one or more second users and the third user.

5. A computer program product for notifying a user of a relationship change, the computer program product comprising:
   one or more computer readable storage media; and
   program instructions stored on the one or more computer readable storage media, the program instructions comprising:
      program instructions to receive a first input, wherein the first input is from a first user to one or more second users, and wherein the first input includes a text to be sent from the first user to the one or more second users, wherein the text is a comment;
      program instructions to determine whether the text includes a third user, wherein the third user is not one of the one or more second users;
      program instructions, responsive to determining the text includes the third user, to determine whether there was a relationship change between the one or more second users and the third user;
      program instructions, responsive to determining there was a relationship change between the one or more second users and the third user, to determine whether the first user is aware of the relationship change between the one or more second users and the third users, wherein the determination is made by whether the first user viewed a page or a comment that mentioned the relationship change;
      program instructions, responsive to determining that the first user is not aware of the relationship change between the one or more second users and the third user, to notify the first user of the relationship change;
      program instructions, responsive to notifying the first user of the relationship change, to receive a second input, wherein the second input is from the first user to the at least one second user, and wherein the second input includes modifying the text to be sent from the first user to the at least one second user; and
      program instructions, responsive to receiving the second input, to discard the first input and transmit the second input from the first user to the at least one second user.

6. The computer program product of claim 5, further comprising program instructions, stored on the one or more computer readable storage media, to:
   responsive to notifying the first user of the relationship change, receive an indication from the first user, wherein the indication is to transmit the text from the first user to the at least one second user.

7. The computer program product of claim 5, wherein the program instructions to determine whether there was a relationship change between the one or more second users and the third user uses natural language processing to detect and identify words that infer a change in relationship.

8. The computer program product of claim 5, wherein the relationship change is one or more of the following: a change to a relationship between the one or more second users and the third user, a change in status of a relationship between the one or more second users and the third user, an interaction change of a relationship between the one or more second users and the third user, an end of a relationship between the one or more second users and the third user, or a formation of a relationship between the one or more second users and the third user.

9. A computer system for notifying a user of a relationship change, the computer system comprising:
   one or more computer processors;
   one or more computer readable storage media; and
   program instructions stored on the one or more computer readable storage media for execution by at least one of the one or more computer processors, the program instructions comprising:
      program instructions to receive a first input, wherein the first input is from a first user to one or more second users, and wherein the first input includes a text to be sent from the first user to the one or more second users, wherein the text is a comment;

program instructions to determine whether the text includes a third user, wherein the third user is not one of the one or more second users;

program instructions, responsive to determining the text includes the third user, to determine whether there was a relationship change between the one or more second users and the third user;

program instructions, responsive to determining there was a relationship change between the one or more second users and the third user, to determine whether the first user is aware of the relationship change between the one or more second users and the third users, wherein the determination is made by whether the first user viewed a page or a comment that mentioned the relationship change;

program instructions, responsive to determining that the first user is not aware of the relationship change between the one or more second users and the third user, to notify the first user of the relationship change;

program instructions, responsive to notifying the first user of the relationship change, to receive a second input, wherein the second input is from the first user to the at least one second user, and wherein the second input includes modifying the text to be sent from the first user to the at least one second user; and program instructions, responsive to receiving the second input, to discard the first input and transmit the second input from the first user to the at least one second user.

10. The computer system of claim 9, further comprising program instructions, stored on the one or more computer readable storage media for execution by the at least one of the one or more computer processors to:

responsive to notifying the first user of the relationship change, receive an indication from the first user, wherein the indication is to transmit the text from the first user to the at least one second user.

11. The computer system of claim 9, wherein the program instructions to determine whether there was a relationship change between the one or more second users and the third user uses natural language processing to detect and identify words that infer a change in relationship.

* * * * *